United States Patent
Tanijiri et al.

[11] Patent Number: 6,122,101
[45] Date of Patent: *Sep. 19, 2000

[54] OPTICAL DEVICE HAVING DIOPTRIC CORRECTION DEVICE

[75] Inventors: Yasushi Tanijiri, Sakai; Kenji Ishibashi, Izumi, both of Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/954,304

[22] Filed: Oct. 20, 1997

Related U.S. Application Data

[63] Continuation of application No. 08/539,078, Oct. 4, 1995, abandoned.

[30] Foreign Application Priority Data

Oct. 5, 1994 [JP] Japan ................................. 6-241266
Oct. 5, 1994 [JP] Japan ................................. 6-241267

[51] Int. Cl.$^7$ .................................................. G02B 23/00
[52] U.S. Cl. .................... 359/407; 359/410; 359/411; 359/412; 359/414; 359/416; 359/422; 345/7; 345/8; 345/9; 345/85
[58] Field of Search ........................... 359/407, 410, 359/411, 412, 414, 416, 418, 421, 422; 345/7, 8, 9, 85

[56] References Cited

U.S. PATENT DOCUMENTS 5,231,434   7/1993   Kennedy et al. .................. 353/122

FOREIGN PATENT DOCUMENTS 217911    12/1983   Japan ................................. 359/407
5-191746   7/1993   Japan .
50344450  12/1993   Japan .

Primary Examiner—Cassandra Spyrou
Assistant Examiner—Mohammad Y. Sikder
Attorney, Agent, or Firm—Burns, Doane, Swecker & Mathis, LLP

[57] ABSTRACT

An optical device having a dioptric correction device comprises a reference image display unit which is placed in the optical path extending from an object image to the optical system. The reference image is used for dioptric correction. The left and right reference images are different and are displayed on the left and right reference image display units when dioptric correction is performed. The reference image display unit is placed at a predetermined position between the optical system and an image display unit. Since the reference image is positioned at the predetermined position, both of the image of the image display unit and the reference image may be seen clearly.

27 Claims, 11 Drawing Sheets

LEFT

RIGHT

FIG.7
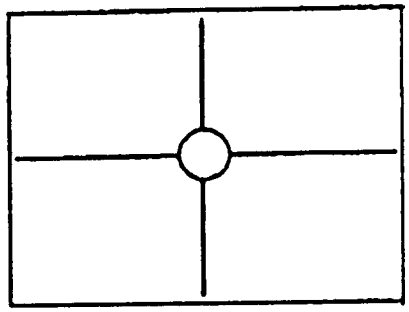
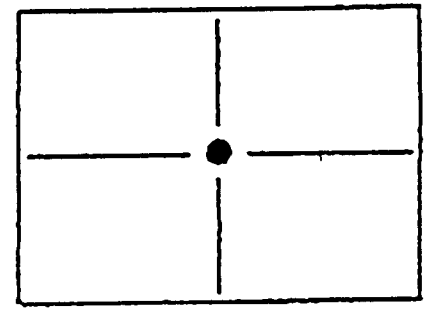
LEFT　　　　　　　　　RIGHT

FIG.8
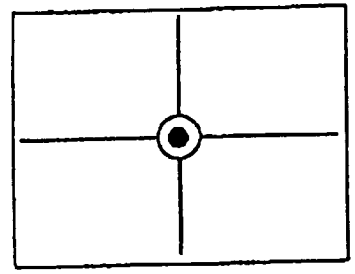
FIG.9
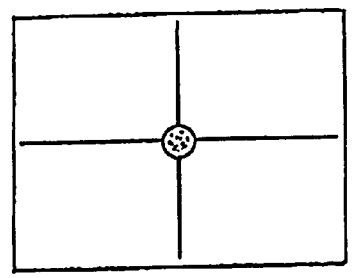
FIG.10
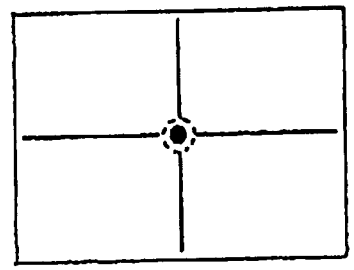
FIG.11
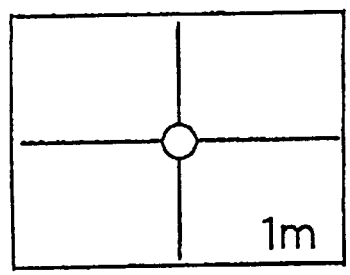
LEFT
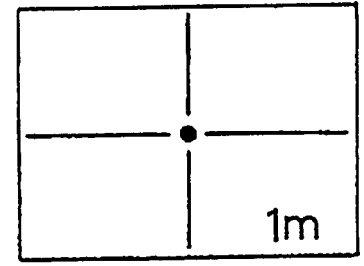
RIGHT

OPTICAL DEVICE HAVING DIOPTRIC CORRECTION DEVICE

This application is a continuation, of application Ser. No. 08/539,078, now abandoned filed Oct. 4, 1995.

BACKGROUND OF THE INVENTION

1. Field of the Invention

The present invention relates to an optical device such as binoculars, camera finders and head mounted displays (HMD) that are used to observe images through an optical system comprising lenses, mirrors and the like. More particularly, the present invention relates to an optical device having a dioptric correction device.

2. Description of the Prior Art

Human eyes normally perform appropriate focus adjustment depending on the distance between the object and the eye so that an observation object located at any point over the distance between close-range and infinity may be seen clearly. However, in the case of nearsightedness and farsightedness, this focus adjustment function does not work well, and consequently the range of distance over which the object may be clearly observed is limited.

For an optical device used to observe virtual images through optical lenses or mirrors, it is necessary to have a dioptric correction mechanism so that a sharp image is provided to the eye regardless of whether the observer has normal vision or is nearsighted or farsighted. A system in which the eye piece may be moved back and forth along its optical axis is the most commonly used dioptric correction device. For example, as publicly known in connection with binoculars, the position of the eye piece is adjusted by the observer himself while he is observing the image of the object so that the image can be seen clearly. Because the distance between the eye and the virtual image changes depending on where the eye piece is positioned, a virtual image position may be set at which the image can be observed with sharpness.

In an optical device in which image observation is made using both eyes, such as binoculars and binocular HMDs, it is necessary to perform dioptric correction independently for each eye because very often the observer's eyes suffer from differing degrees of nearsightedness or farsightedness. In this case, making adjustment separately for each eye, i.e., making dioptric correction for one eye first and then for the other eye, is the common practice. In addition, when dioptric correction is made for one eye, usually the other eye is closed while the adjustment is being made because the image seen by the other eye hinders the adjustment. Depending on the observer, however, dioptric correction may be made for both eyes with both eyes open.

If the object is within prescribed range of distance, observation of an object may be made clearly, because human eyes have the ability of focus adjustment. Therefore, when the observer himself performs dioptric correction so that clear image observation may be performed, a sharp image is obtained when a virtual image is at anywhere within said range. Therefore, even if the distance between the eye and the object is the same, the distance between the eye and the virtual image, however, is not maintained constant at all times but varies every time adjustment is made.

With regard to devices in which both eyes are used for observation, an example in which dioptric correction is made separately for the left and right eyes will be explained with reference to FIG. 12. In this case, when eye pieces 2 are moved for each of the eyes, one by one, to perform dioptric correction, both eyes 4 come to observe sharp images. However, because the degree of refraction is different from one eye to the other, and because human eyes, as described above, have the ability of focus adjustment, the distance between the eye and the virtual image is not necessarily identical for both eyes. For example, as shown in the drawing, there is a possibility that, as to right optical system R, the virtual image is located at position FR, which is the closest position to the eye within the range of distance over which the image is seen clearly, as shown by arrow AR, while as to left optical system L, the virtual image is located at a position within range AL different from said range AR which is the farthest position from the eye.

Thus, although each of the eyes can observe a sharp image independently, when both eyes are used for observation, the positions of the virtual images do not coincide. If image observation is performed while there is a difference between the eyes in terms of the distance between the eye and the image, the eyes become strained, and if this is continued over a long period of time, both the eyes and the brain become extremely fatigued.

In order to prevent such a problem, if dioptric correction is done for both eyes simultaneously while both eyes are open, when dioptric correction is performed initially for one eye, image observation may be made with a certain level of sharpness even if dioptric correction for the other eye is incomplete. As a result, image observation may be performed without fully completing dioptric correction for the other eye, and the adjustment operation is terminated without completely performing dioptric correction. Then, one eye observes a sharp image while the other eye observes a less sharp image, which causes strain and fatigue to the eyes.

In addition, when dioptric correction is performed by moving the eye piece back and forth from the position at which it is set at the time, there is no information as to which direction the eye piece should be moved. It thus becomes necessary to determine the direction in which it should be moved through trial and error. Moreover, dioptric correction using the conventional method described above is performed while the actual object of observation is being observed, and consequently when the observation object itself does not have a clear outline or sharp aspects such as straight lines, dioptric correction becomes quite difficult. In this case, the adjustment operation becomes rather time-consuming, and moreover complete dioptric correction may not even be possible.

As described above, in dioptric correction using a conventional method, because there is a certain range of distance in which the virtual image may be observed clearly, dioptric correction may result in a setting at which the observer experiences eye strain. Furthermore, depending on the observation object, adequate dioptric correction may not be performed and the purposes of dioptric correction may not be fully attained.

As publicly known, Japanese Laid Open Patent Hei 5-344450 shows an art in which images used for adjustment purposes are displayed on left and right image display units during the dioptric correction process in an eyeglasses-type display device having left and right image display units. The observer can perform dioptric correction using the sharp adjustment images, which makes dioptric correction easy.

However, even in this method, it cannot prevent the situation where the distance between the eye and the virtual image is not identical for both eyes. In addition, where dioptric discrepancy exists, information as to whether the eye piece is located off the position at which it would allow sharp observation in the direction away from the eye or in the direction toward the eye cannot be obtained. Therefore, in order to learn which direction the eye piece should be moved, the eye piece must be moved slightly back and forth from the position at which it is set at the time. Such a trial and error operation makes adjustment inconvenient.

Further, while this method is useful in an optical device such as HMD in which an image displayed on a display unit is observed, it cannot be applied in an optical device such as binoculars, in which an image other than the image displayed on the display unit is observed.

Moreover, in general, the shorter the distance between the eye and the object, the more strained the human eye becomes. If the virtual image is set at a position close to the eye in the dioptric correction process, while a sharp image can be observed, the eye becomes strained and fatigued.

SUMMARY OF THE INVENTION

The object of the present invention is to provide an optical device having a dioptric correction device that can be applied either in an optical system as to which a displayed image shown on a built-in display unit is observed or in an optical system as to which an image existing externally is observed, and that is capable of easily performing dioptric correction without failure regardless of the level of sharpness of the image, i.e., the observation object image.

Yet another object of the present invention is to provide an optical device having a dioptric correction device which is capable of easily performing dioptric correction without failure and which sets the position of the virtual image, i.e., the observation object, far from the eye in order to reduce the amount of strain on the eye of the observer.

In order to achieve said objects, when used in an optical device in which the image is observed through an optical system and which requires dioptric correction, the present invention is constructed such that a reference image display unit is placed in the optical path extending from the image to the optical system so that a reference image used for dioptric correction is displayed on the reference image display unit when dioptric correction is performed.

Further, when used in an optical device in which image observation is performed using both eyes through left and right optical systems and which requires dioptric correction, the present invention is constructed such that reference image display units are placed in the left and right optical paths extending from the images to the left and right optical systems, respectively, so that the left and right reference images, which are different, are displayed on the left and right reference image display units when dioptric correction is performed.

In the dioptric correction device used in an optical device to observe a virtual image by means of an optical system, the construction is also such that a reference image used for dioptric correction is displayed in the optical path extending from the virtual image to the optical system and the virtual image is positioned far away from the eye by virtue of performing dioptric correction, so that the reference image and the virtual image may be seen clearly.

In an optical device comprising left and right optical systems, when different reference images are displayed for the left and right optical systems, respectively, the same effects as described above can be obtained in the dioptric correction for each optical system, and moreover, because different reference images are displayed for the left and right optical systems, if dioptric discrepancy exists as to either of the optical systems, the dioptric discrepancy may be recognized even when adjustment is carried out while observation is made using both eyes. Moreover, dioptric correction may be performed such that the distance between the eye and the reference image is identical for both optical systems.

In addition, because a reference image is displayed when dioptric correction is performed, the reference image can also be used for the purpose of dioptric correction as well as the observation object image. Since the reference image is displayed closer to the eye than the observation object image, when dioptric correction is made vis-a-vis the reference image, the virtual image, i.e., the observation object, inevitably becomes positioned far from the eye. In this way, the virtual image can be placed far from the eye easily and without failure. Because the farther away the observation object image is from the eye, the less strained the eye becomes, the observer's eye fatigue may be reduced.

By making the reference image invisible except during dioptric correction, the effects described above can be obtained during dioptric correction, in addition to which image observation may be performed without being hindered by the reference image after dioptric correction is performed.

These and other objects and features of this invention will become clear from the following description, taken in conjunction with the preferred embodiments with reference to the accompanied drawings.

BRIEF DESCRIPTION OF THE DRAWINGS

FIG. 7 is an illustration showing left and right reference images.

FIG. 8 is an illustration showing left and right reference images fused through binocular observation.

FIG. 9 is an illustration showing left and right reference images fused through binocular observation when there is no dioptric discrepancy as to the left reference image but there is dioptric discrepancy as to the right reference image.

FIG. 10 is an illustration showing left and right reference images fused through binocular observation when there is dioptric discrepancy as to the left reference image but there is no dioptric discrepancy as to the right reference image.

FIG. 11 is an illustration showing left and right reference images displayed together with the distances between the eyes and the virtual images, respectively.

DETAILED DESCRIPTION OF THE PREFERRED EMBODIMENTS

Figure 1:
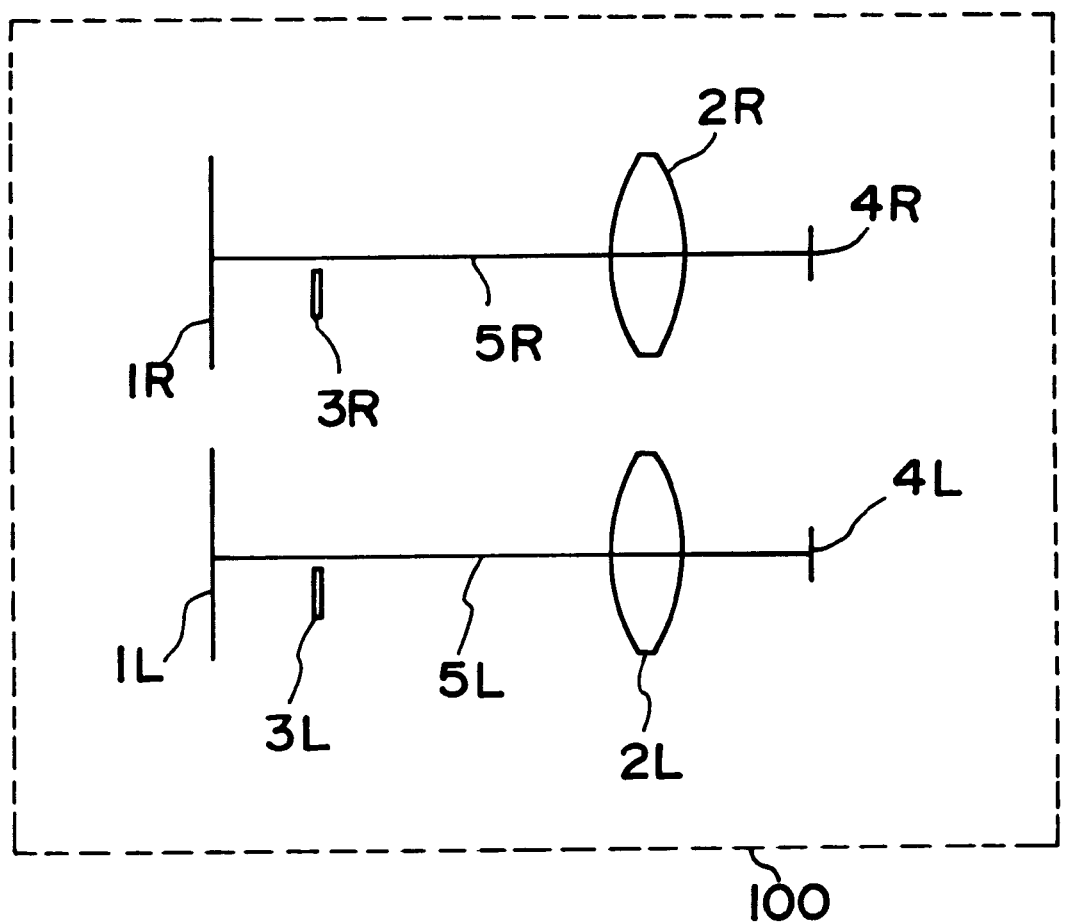
FIG. 1 shows the construction of optical systems of a binocular optical device having a dioptric correction device in accordance with an embodiment of the present invention.
Figure 14:
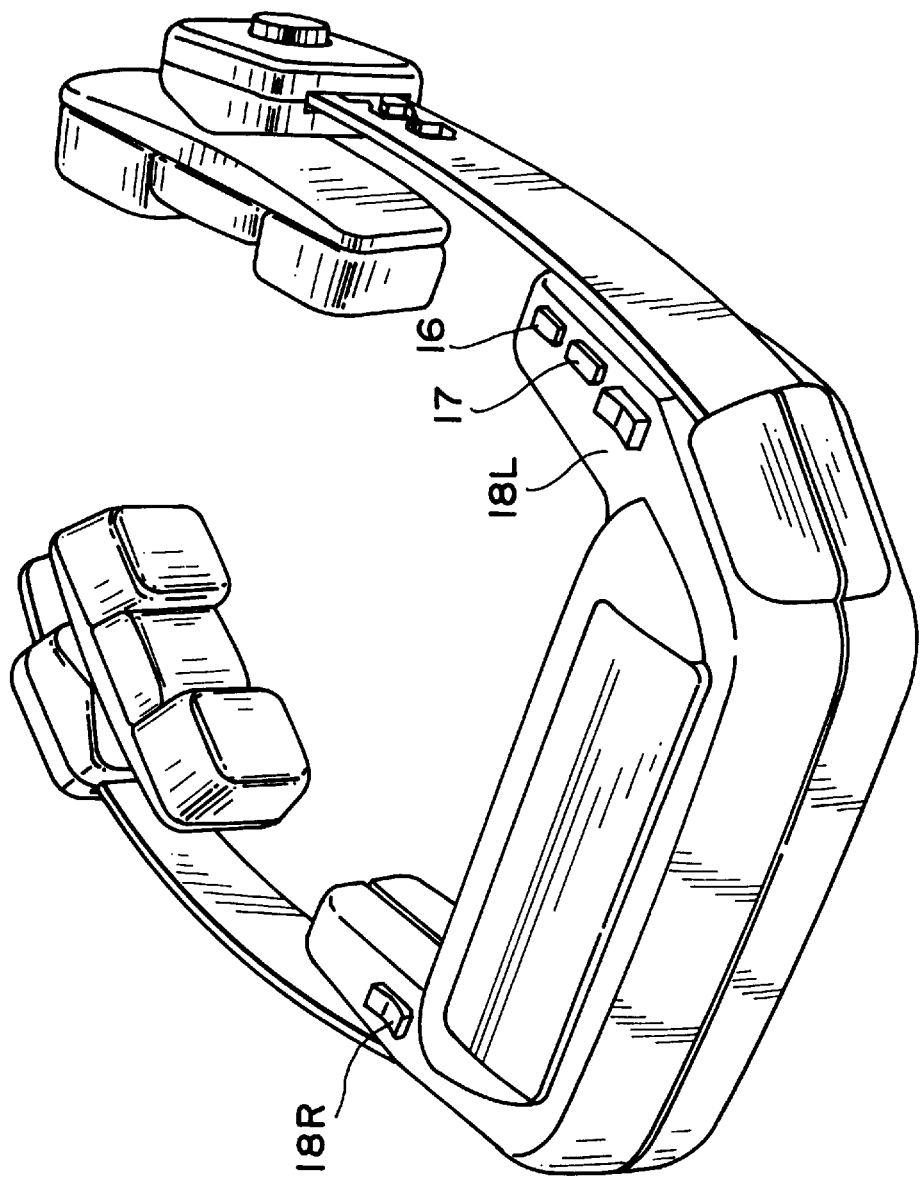
FIG. 14 shows the appearance of an HMD in which the dioptric correction device of the embodiment may be applied.

FIG. 1 shows the construction of a binocular optical device 100 having the dioptric correction device, which is an embodiment of the present invention. This device has a pair of left and right image display units 1L and 1R (also referred to as "image forming units"), each comprising a liquid crystal display. The images displayed on image display units 1L and 1R are observed by left and right eyes 4L and 4R via left and right eye pieces 2L and 2R, respectively. Left and right eye pieces 2L and 2R are located such that their respective optical axes 5L and 5R are parallel to each other. Image display units 1L and 1R are located such that their respective display surfaces exist on the same plane and are vertical to optical axes 5L and 5R, respectively, while optical axes 5L and 5R pass through the centers of the respective display surfaces. This dioptric correction device may be applied in an HMD shown in FIG. 14, for example.

Left eye piece 2L is located such that it can move along optical axis 5L. Dioptric correction for left eye 4L is carried out by adjusting the distance between image display unit 1L and eye piece 2L by moving eye piece 2L along optical axis 5L by a lens drive circuit. Right eye piece 2R is also located such that it can move along optical axis 5R. Dioptric correction for right eye 4R is performed by adjusting the position of right eye piece 2R. Left and right eye pieces 2L and 2R move independently of each other so that dioptric correction may take place independently.

Reference image display units 3L and 3R, each comprising a transparent LCD, are located between left image display unit 1L and left eye piece 2L and between right image display unit 1R and right eye piece 2R, respectively. Left and right reference image display units 3L and 3R are located at identical distances from the display surfaces of image display units 1L and 1R. These reference image display units 3L and 3R display reference images used for reference during dioptric correction.

Figure 2:
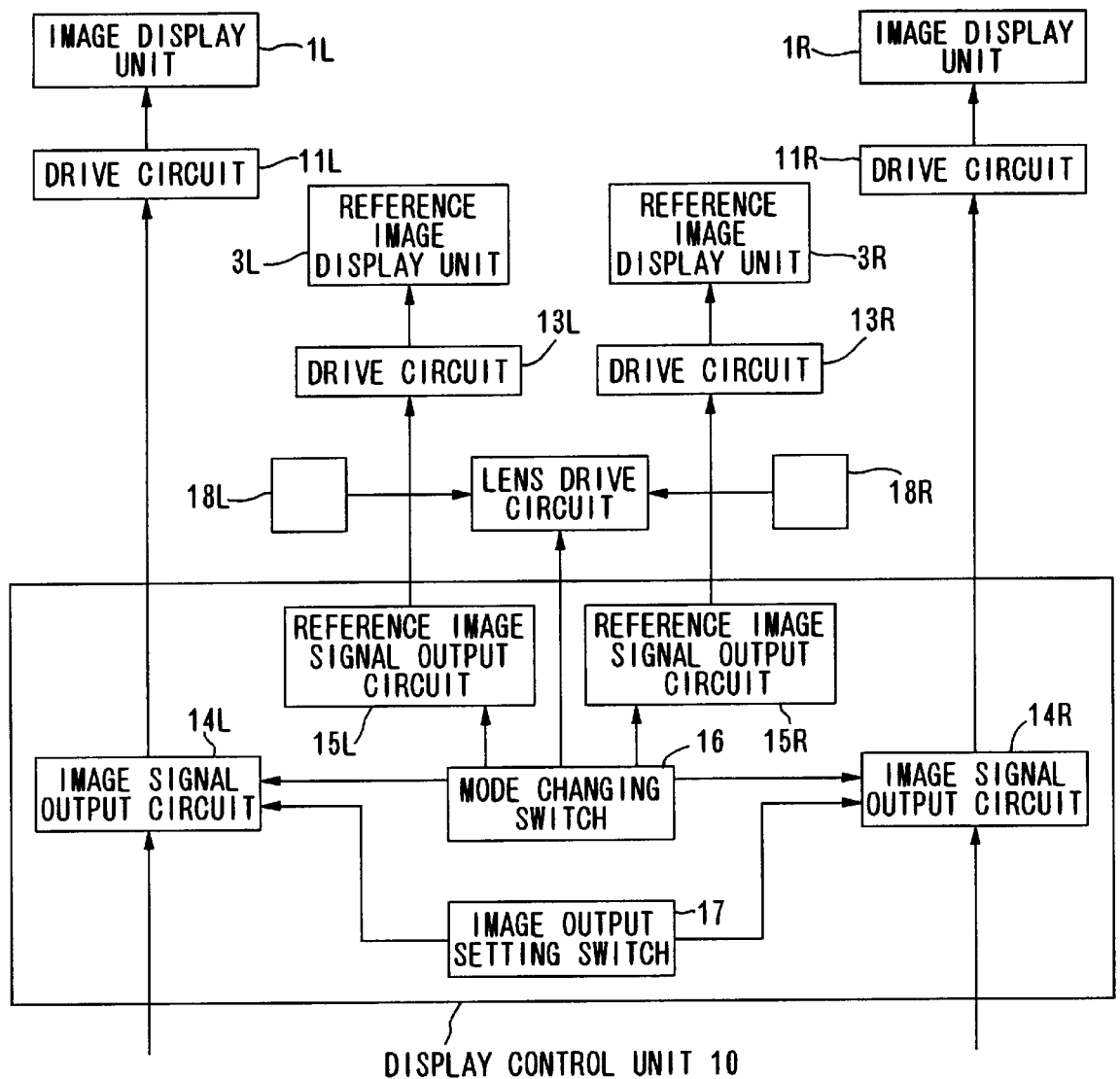
FIG. 2 shows the construction of an image display control circuit of the embodiment.

FIG. 2 shows the construction of the circuit for the control of image display. Image display units 1L and 1R are driven by drive circuits 11L and 11R and reference image display units 3L and 3R are driven by drive circuits 13L and 13R. These drive circuits 11L, 11R, 13L and 13R are controlled by display control unit 10. Display control unit 10 has image signal output circuits 14L and 14R and reference image signal output circuits 15L and 15R. Object image signal output circuits 14L and 14R output left and right object image signals input from external sources to drive circuits 11L and 11R, respectively, so that images are displayed on left and right image display units 1L and 1R.

Figure 3:
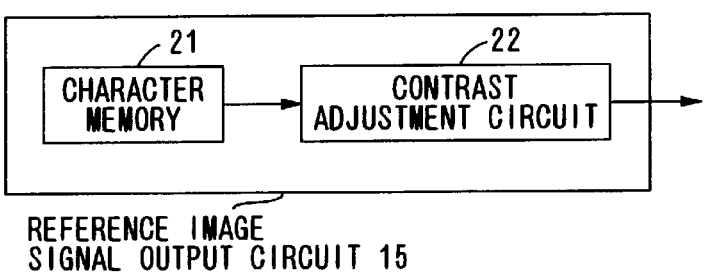
FIG. 3 shows the construction of a reference image display circuit of the embodiment.

Reference image signal output circuits 15L and 15R each have character memory 21 and contrast adjustment circuit 22, as shown in FIG. 3. Prescribed symbol information to be displayed as a reference image is retained in character memory 21. Contrast adjustment circuit 22 comprises a differentiation circuit and converts the symbol information of character memory 21 into sharp, high contrast image signals. The output from reference image signal output circuits 15L and 15R is input to drive circuits 13L and 13R, whereby reference images are displayed on reference image display units 3L and 3R.

The optical device in this embodiment is used in two different modes: an observation mode in which standard image observation is performed, and a dioptric correction mode in which dioptric correction is performed. Consequently, image control unit 10 has mode changing switch 16 and image output setting switch 17. Mode changing switch 16 is connected to image signal output circuits 14L and 14R as well as to reference image signal output circuits 15L and 15R. The status of the setting of mode changing switch 16 is transmitted to image signal output circuits 14L and 14R and reference image signal output circuits 15L and 15R, and the output of signals is controlled. Image output setting switch 17 is connected to image signal output circuits 14L and 14R and controls the output/non-output of object image signals in the dioptric correction mode. Mode changing switch 16 and image output setting switch 17 are manually operated and are set appropriately by the observer.

When mode-changing switch 16 is set to the observation mode, image signal output circuits 14L and 14R output object image signals and object images are displayed on image display units 1L and 1R. This does not depend on the status of the setting of image output setting switch 17. In the observation mode, neither left or right reference image signal output circuits 15L nor 15R outputs signals, so nothing is displayed on reference image display units 3L or 3R. Since reference image display units 3L and 3R are transparent LCDs, they do not hinder image observation in the observation mode.

When mode changing switch 16 is set to the dioptric correction mode, reference image signal output circuits 15L and 15R output reference image signals that they respectively hold, and reference images are output to left and right reference image display units 3L and 3R. Then, the output of object image signals from image signal output circuits 14L and 14R depends on the status of the setting of image output setting switch 17. If image output setting switch 17 is set to ON, object image signals are output from image signal output circuits 14L and 14R and object images are displayed. If it is set to OFF, no object image signals are output and no object image is displayed. Normally, image output setting switch 17 is set to ON and dioptric correction is carried out while both object images and reference images are displayed.

Figure 4:
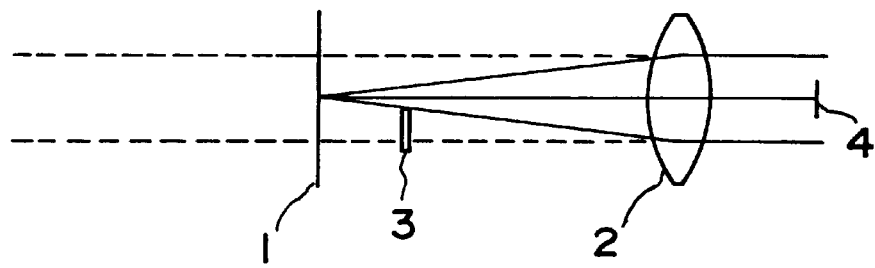
FIG. 4 is an illustration showing the optical path for the object image when the front focal point of the eye piece coincides with the image display surface.
Figure 5:
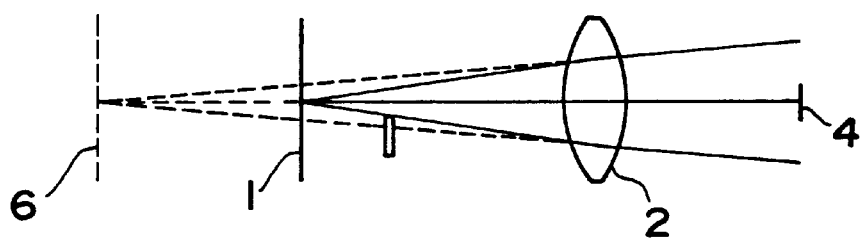
FIG. 5 is an illustration showing the optical path for the object image when the front focal point of the eye piece is past the image display surface.

Dioptric correction is performed separately for left and right eyes, but the method thereof is identical for both eyes. Accordingly, an explanation is given below with regard to one eye. In dioptric correction, the direction in which eye pieces 2 should be moved is indicated using buttons 18L and 18R used for the left and right optical systems, respectively. If eye piece 2 is set such that its front focal point exists on the display surface of image display unit 1, the object image light passes through eye piece 2 and becomes a parallel beam, as shown in FIG. 4, whereby the diopter becomes zero. Then, eye 4 observes a virtual image positioned at infinity. If a person with normal vision observes in this condition, a sharp image is observed, while if a person with abnormal vision observes, the image looks blurry. If the distance between image display unit 1 and eye piece 2 is set short such that the display surface of image display unit 1 is positioned between the front focal point of eye piece 2 and eye piece 2, the object image light becomes a divergent beam after passing through eye piece 2, as shown in FIG. 5, and it enters eye 4 as if being emitted from virtual image plane 6. Eye 4 consequently observes the virtual image positioned at virtual image plane 6. Then, the virtual image is located at a finite distance, whereby a diopter appropriate to that distance is obtained. If a person with normal vision observes the image in this condition that the distance between the image display unit 1 and eye piece 2 is shorter, it looks blurry.

Figure 6:
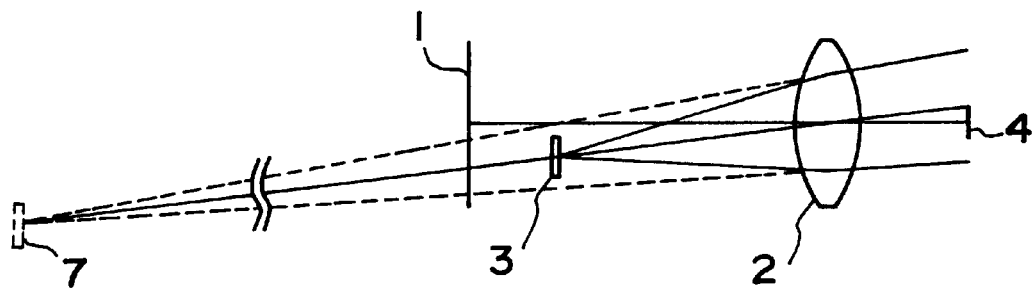
FIG. 6 is an illustration showing the optical path for the reference image when the front focal point of the eye piece coincides with the image display surface.
Figure 12:
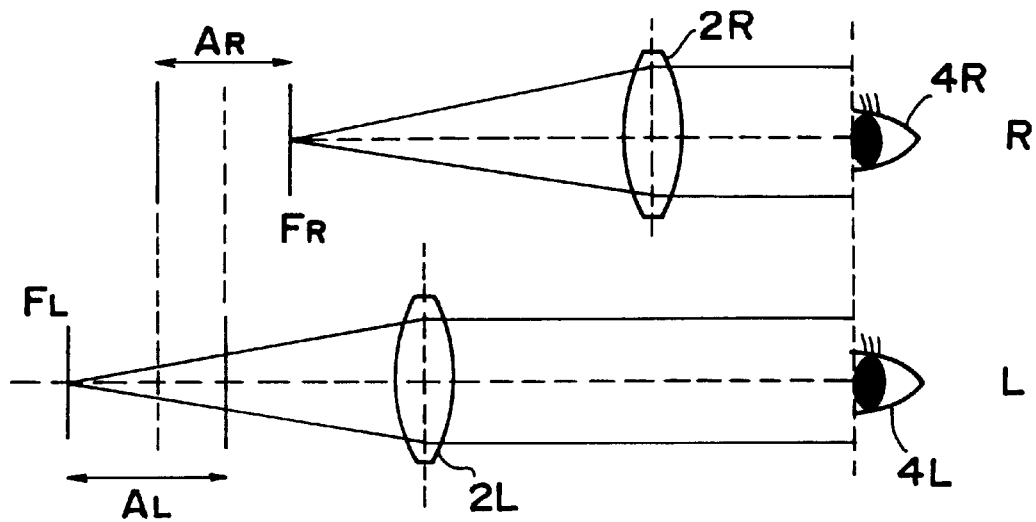
FIG. 12 shows an outline of the construction of optical systems to explain the problems of the conventional technology.

When mode changing switch 16 is operated so that the dioptric correction mode is set, a reference image is displayed on reference image display unit 3. Reference image display unit 3 is located between image display unit 1 and eye piece 2. If eye piece 2 is set so that its front focal point coincides with the display surface of image display unit 1, the reference image is observed as if existing on virtual image plane 7, which is located at a finite distance, therefore giving rise to a diopter appropriate to said finite distance, as shown in FIG. 6. If image output setting switch 17 is set to ON, the observer observes both the object image on virtual image plane which is located at infinity and the reference image on virtual image plane 7 in FIG. 6. Then, the object image is observed to exist farther away than the reference image at all times.

When dioptric correction is performed while both the object image and the reference image are being displayed, because the distance between the eye and the object image and the distance between the eye and the reference image are different, information regarding which direction eye piece 2 should be moved is obtained. For example, when the object image is observed to be sharper than the reference image, this indicates that the eye piece is off the sharp observation position in the direction away from the eye and therefore dioptric correction can be made by moving eye piece 2 closer to eye 4. Conversely, when the reference image is observed to be sharper than the object image, this indicates that the eye piece is off the sharp observation position in the direction toward the eye and therefore dioptric correction may take place by moving eye piece 2 away from eye 4.

In addition, the level of dioptric discrepancy may be known from the difference in sharpness between the object image and the reference image. Consequently, speedy movement of eye piece 2 appropriate to the level of dioptric discrepancy becomes possible in order to perform rough adjustment.

Moreover, because virtual image plane 6 on which the object image exists is at a position farther away from eye 4 in comparison with virtual image plane 7 on which the reference image exists, where dioptric correction has been performed so that both the object image and reference image may be observed sharply, virtual image plane 6 on which the object image exists will not be located near the position closest to the eye within the distance range in which the object image is seen sharply. Thus, if dioptric correction is performed vis-a-vis the object image and the reference image while observing both of them, the object image is led away from the eye. As a result, eyestrain caused by the attentive viewing of a close-range object image may be avoided.

Reference image display unit 3 displays a sharp, high contrast image. Reference images displayed on left and right reference image display units 3L and 3R in FIG. 1 are shown in FIG. 7. As is obvious from FIG. 7, the configuration of the reference image differs from left to right. The configuration of the reference images include common parts between left and right, which are horizontal and vertical lines in FIG. 7, and uncommon parts. The common and uncommon parts are perceptible against the background region 50 on the display surfaces of the display units 3L and 3R. The sizes of the uncommon parts in the configuration of the reference image's are sufficiently smaller than at of the common parts. Therefore, it is easy to fuse the left and right images in the brain. If the left reference image is observed by left eye 4L and the right reference image is observed by right eye 4R simultaneously when these reference images are being displayed on reference image display units 3L and 3R after appropriate dioptric correction is made, the left and right images are fused in the brain and are recognized by the observer as a single image as shown in FIG. 8. Since these reference images are sharp and have high contrast, dioptric correction vis-a-vis the reference images can be performed quite easily.

Situations in which dioptric correction has been performed with regard to one reference image while dioptric discrepancy still exists as to the other reference image are shown in FIGS. 9 and 10. In these drawings, where a reference image is comprised of dotted lines, said reference image is not being observed with sharpness due to dioptric discrepancy. In FIG. 9, appropriate dioptric correction has been performed as to the left reference image and dioptric discrepancy still exists with regard to the right reference image, while in FIG. 10, dioptric discrepancy still exists as to the left reference image and appropriate dioptric correction has been performed as to the right reference image.

Since the left and right reference images have different configurations, where dioptric correction is performed while both left and right reference images are observed simultaneously using both eyes, the observer can recognize if dioptric discrepancy exists with regard to one of the reference images, as shown in FIGS. 9 or 10. Consequently, dioptric correction may be performed for both eyes via observation using both eyes at all times without closing one of the eyes.

Figure 13:
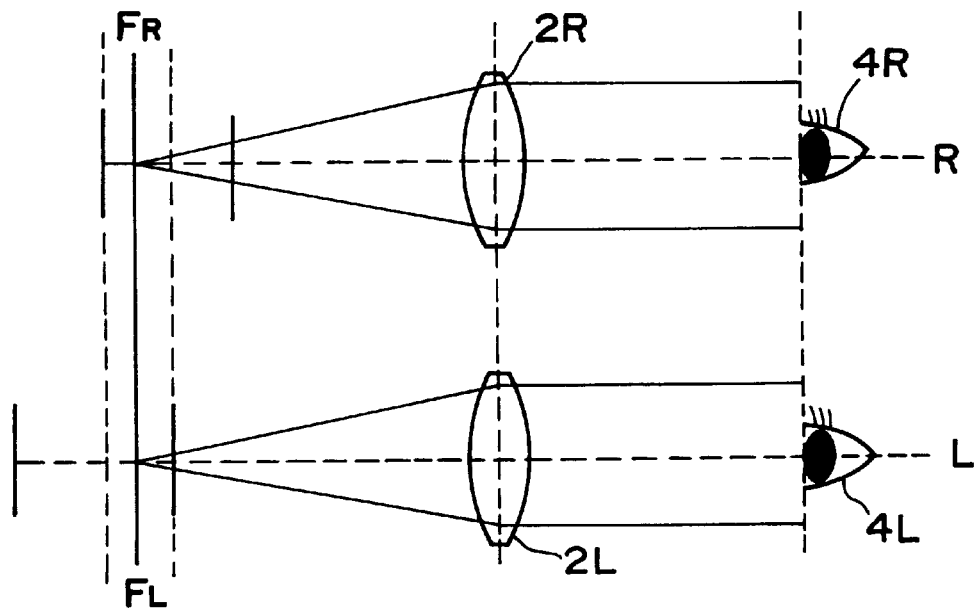
FIG. 13 shows an outline of the construction of optical systems in a situation in which the left and right virtual images are at identical distances from the eyes.

Further, when there is a difference between the left and right eyes in terms of the distance between eye 4 and virtual image plane 7 shown in FIG. 6, due to the fact that the left and right reference images are configured differently, it can be recognized through binocular observation that the left and right reference images do not exist on the same plane. In this case, if one or both of eye pieces 2L and 2R are adjusted to a position within the range that does not give rise to dioptric discrepancy, the left and right reference images observed can be set such that they exist on the same plane. As shown in FIG. 13, if the range of distance over which the virtual image can be sharply observed differs between the left and right eyes but there is a plane which works for both, adjustment should be done such that the virtual images exist on that plane. Sharp images can then be observed for both the left and right eyes and at the same time, the distances between the left and right eyes and the virtual images (FL, FR) can be made identical.

As described above, because the distance between reference image display unit 3L and image display unit 1L and the distance between reference image display unit 3R and image display unit 1R are set to be identical, if the distance between the eye and virtual image plane 7 with regard to the reference image is set identical for both eyes, the distance between the eye and virtual image plane 6 with regard to the object image (FIG. 5) displayed on image display units 1L or 1R is also set to be identical for both eyes. Therefore, when the object image is observed in the observation mode after completion of dioptric correction, the distance between the eye and the object image observed becomes identical for both eyes, eliminating the strain on the eyes due to the difference between the eyes in terms of said distance.

The reference image displayed on reference image display unit 3L (3R) may be such that it overlaps the entire area of the image on image display unit 1L (1R), or it may be such that it overlaps a part of the image area, i.e., the lower right area of the left object image and the lower left area of the right object image, for example.

In the method described above, dioptric correction is performed by virtue of turning ON image output setting switch 17 so that both the reference image and object image are displayed in the dioptric correction mode. However, dioptric correction may be made with image output setting switch 17 set to OFF and therefore without the display of the object image. Because the reference image is sharp and has high contrast, dioptric correction is easier than conventional dioptric correction in which the object image is used. Because the configuration of the reference image is different from left to right, the dioptric correction can be operated in the condition images are observed by both eyes.

However, in this case, when compared with the method in which both the reference image and object image are displayed, only the reference image is used for the purposes of dioptric correction. In addition, because reference image display unit 3L (3R) is located closer to eye piece 2L (2R) than image display unit 1L (1R), the observer performs dioptric correction vis-a-vis the reference image so that the reference image can be observed as close as possible in order to secure adequate dioptric setting as to the object image as well.

If a reference image is displayed on image display unit 1L (1R) as well, or if another pair of reference image display units are placed near image display units 1L and 1R in addition to reference image display units 3L and 3R, the above consideration that the reference image can be observed as close as possible becomes unnecessary. In this case, the reference images relatively located in front and in back of each other should be displayed so that they do not overlap each other. In the case where the second pair of reference image display units are used, because the second reference image is displayed in approximately the same position as the object image, dioptric correction as accurate as where an object image is displayed may be ensured even where an object image is not displayed.

It is also acceptable for the position of virtual image plane 6 or virtual image plane 7 to be calculated as eye piece 2L (2R) is moved in the dioptric correction mode, so that the distance between the eye and the virtual image plane is displayed in addition to the reference image. The observer can learn which direction eye piece 2L (2R) should be moved with reference to the distance thus displayed and can also easily make the distance between the eye and the virtual image identical for both eyes.

In this embodiment, a transparent LCD was used as reference image display unit 3L (3R), but a different type of display unit may also be used as long as it can display sharp, high contrast images and does not hinder image observation while the device is in the observation mode.

Figure 18:
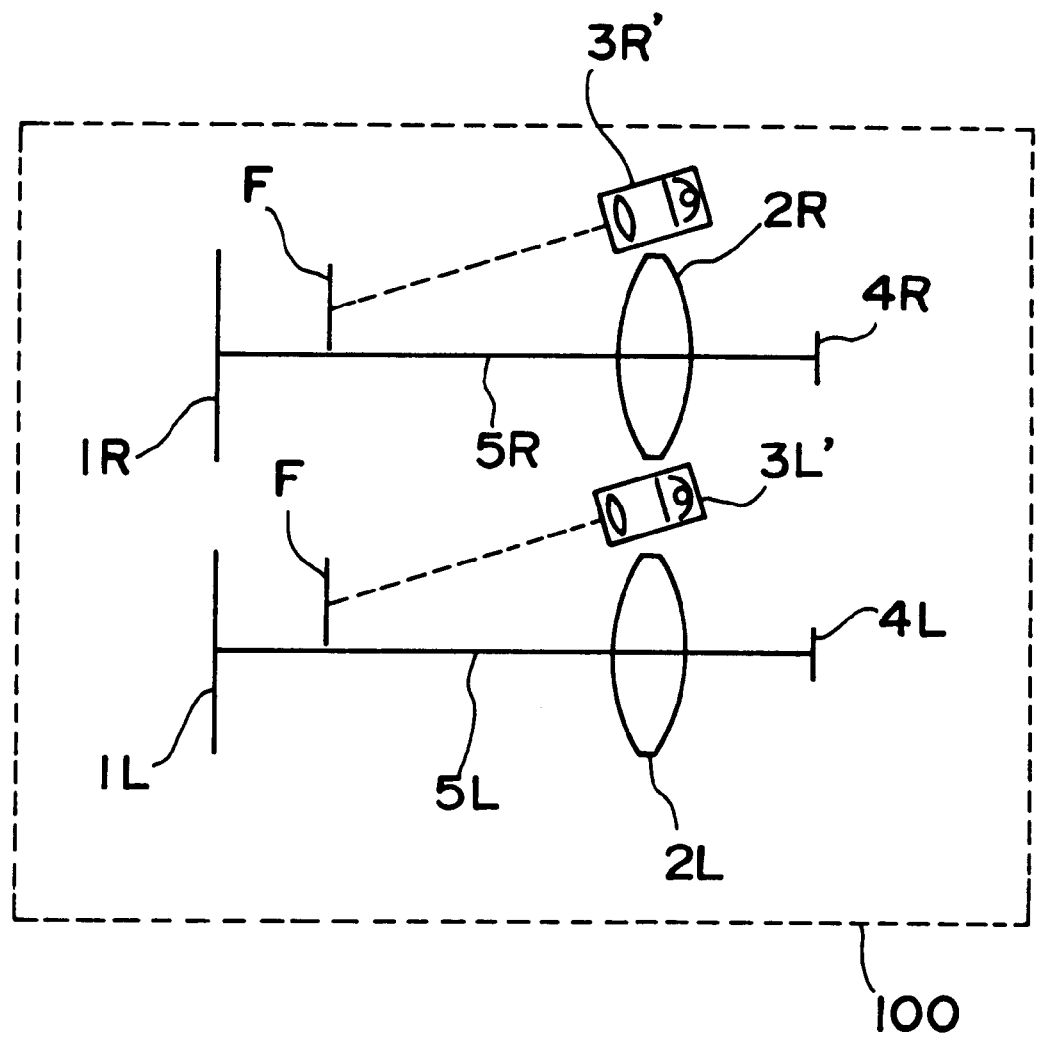
FIG. 18 shows the construction of optical systems of a binocular optical device having a dioptric correction of an another embodiment.

For example, transparent film F may be located between image display unit 1L (1R) and eye piece 2L (2R) so that the reference image is projected and displayed in the dioptric correction mode using a separately located light source 3R', 3L' to project the reference image on the film F, as shown in FIG. 18.

Figure 17:
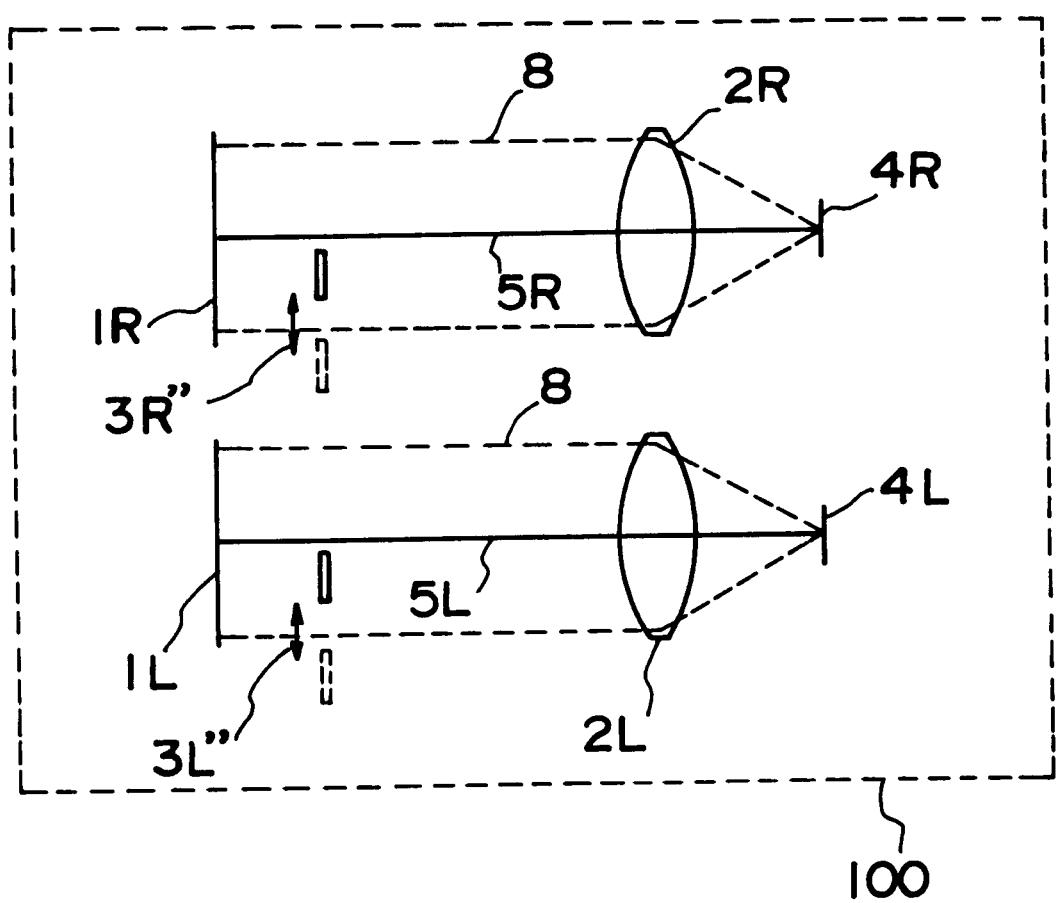
FIG. 17 shows the construction of optical systems of a binocular optical device having a dioptric correction of an another embodiment.

Alternatively, the construction may be such that an LED 3R'', 3L'' is retractably located so that it appears in the optical path 8 between image display unit 1L (1R) and eye piece 2L (2R) and emits light in the dioptric correction mode and retracts from the optical path in the observation mode, as shown in FIG. 17.

The dioptric correction device of the present invention may also be applied to perform dioptric correction using the method in which eye piece 2L (2R) is fixed while image display unit 1L (1R) and reference image display unit 3L (3R) are moved along optical axis 5L (5R). In this case, the movement of reference image display unit 3L (3R) should be linked with image display unit 1L (1R) so that the distance between them is maintained constant at all times.

Figure 15:
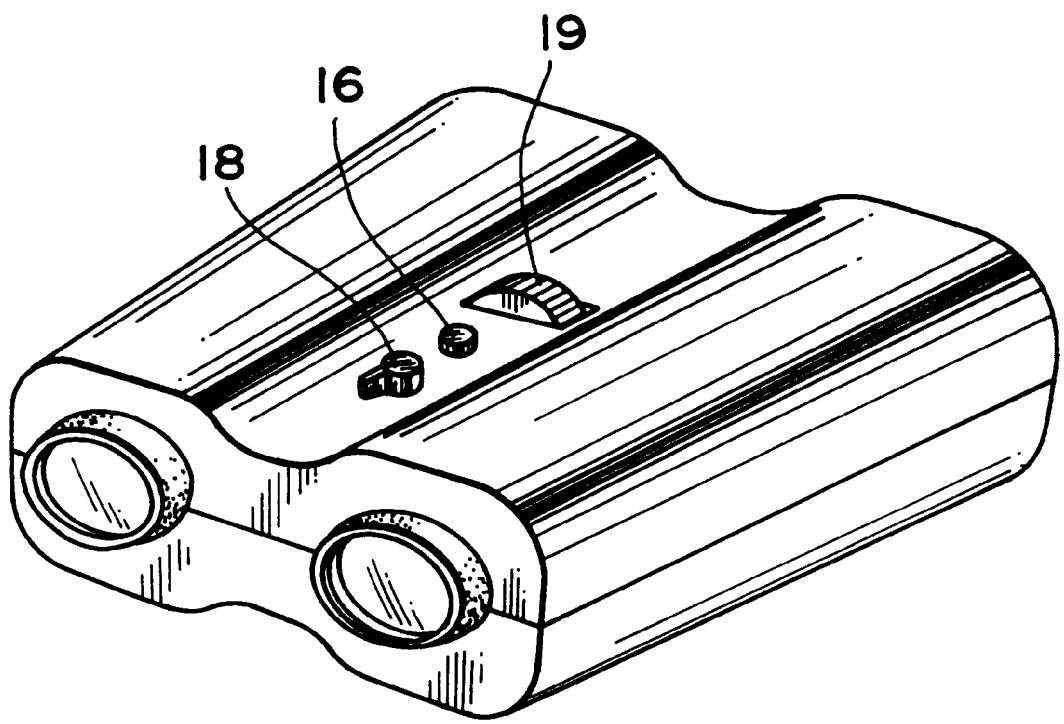
FIG. 15 shows the appearance of binoculars in which the dioptric correction device of the embodiment may be applied.
Figure 16:
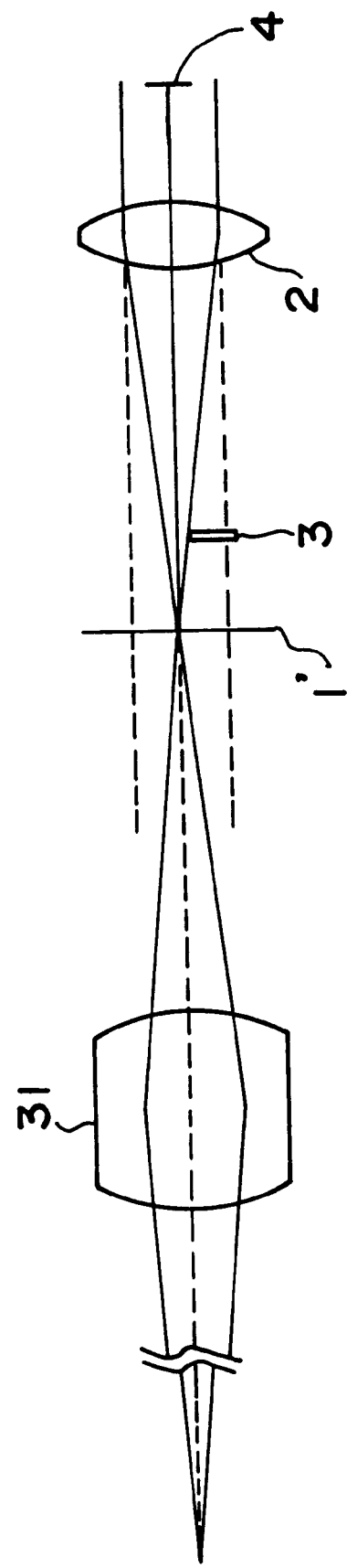
FIG. 16 shows an outline of the construction of an optical system when the dioptric correction device is applied in an optical device in which the observation object is observed through a lens.

While an LCD is used as image display unit 1L (1R) in this embodiment, a different type of display unit, such as a CRT, may be used as well. Moreover, the dioptric correction device of the present invention may be applied not only in optical devices having an image display unit but also in optical devices in which the observation object is observed via an optical system comprising lenses, such as binoculars as shown in FIG. 15. As shown in the drawing, the dioptric correction mode is set using mode switching button 16, and the eye piece is moved by means of adjustment member 18. In the case of binoculars, due to focus adjustment member 19, only one of the left and right eye pieces should be made adjustable for the purposes of dioptric correction. If reference image display units 3 are placed in a fixed position between secondary image plane 1' formed by object lenses 31 and eye pieces 2 in the left and right optical paths, as shown in FIG. 16, dioptric correction can be easily performed without failure as in the case where object images on image display units are observed.

The optical device having a dioptric correction device of the present invention may be applied not only in binocular optical devices but also in optical devices in which image observation is made using only one eye, such as monocles or still cameras or video camera finders.

Obviously, many modifications and variation of the present invention are possible in light of the above teachings. It is therefore to be understood that within the scope of the appended claims, the invention may be practiced other than as specifically described.

What is claimed is:

1. A dioptric correction device for correcting diopter for left and right eyes, comprising:
    left and right display devices, defining a pair of display devices, which display left and right images on their respective display surfaces;
    a pair of optical systems through which said images are observed; and
    a display controller which controls said display devices so as to display images having a figure image portion having a first contrast and a background portion having a second contrast, wherein both said figure image portion and said background portion comprise parts of said images, wherein said figure portion includes a common figure image part and an uncommon figure image part, wherein said common and uncommon part are visually perceptible against the background image portion;

wherein if said left image was placed over said right image, a part of said figure image portion of said left image which directly overlaps a part of said figure image portion of said right image is defined as said common figure image part, and a part of said figure image portion of either said left or right images which does not overlap a part of said figure image portion of said right or left images, respectively, is defined as said uncommon figure image part.

2. A dioptric correction device as claimed in claim 1, wherein the size of said uncommon part is smaller than that of said common part.

3. A dioptric correction device as claimed in claim 1, wherein said display device displays a high contrast image.

4. A dioptric correction device as claimed in claim 1, wherein said image displayed by said display device is observed only in a mode in which dioptric correction can be performed.

5. A dioptric correction device as claimed in claim 1, wherein said display device includes a transparent display device.

6. A dioptric correction device as claimed in claim 1, wherein said display device includes a light emitting device which is removably arranged in the optical path.

7. A dioptric correction device as claimed in claim 1, further comprising a condition indicating device which indicates a condition of dioptric correction in numerical value.

8. The dioptric correction device as claimed in claim 1, where said common part comprises at least one positioning line.

9. The dioptric correction device as claimed in claim 8, wherein said at least one positioning line comprises horizontal and vertical positioning lines.

10. The dioptric correction device as claimed in claim 1, wherein said images displayed by said display controller provide an indication of a direction in which to move said optical systems to focus said dioptric correction device.

11. The dioptric correction device of claim 1, wherein said background region comprises portions of said display surface other than said common and uncommon parts.

12. An optical device having a dioptric correction device for correcting diopter, comprising:

an image forming unit which forms an image;

an optical system through which said image is observed;

a dioptric correcting device which corrects diopter of said optical system for an eye; and a display device which displays an image at a predetermined position between said image forming unit and said optical system so that at said position a front focal point of said optical system is such that both images of said image forming unit and said display device are unblurred;

wherein both images of said image forming unit and said display device are observed with a same degree of clarity when said optical device is in a dioptric corrected state.

13. An optical device having a dioptric correction device as claimed in claim 12, wherein said dioptric correcting device relatively varies a distance between an image of said image forming unit and said optical system to correct diopter.

14. An optical device having a dioptric correction device as claimed in claim 12, wherein said display device includes a transparent display device.

15. An optical device having a dioptric correction device as claimed in claim 12, wherein said said optical device is a binocular observation type.

16. An optical device having a dioptric correction device as claimed in claim 15, wherein said display device displays images different between left and right.

17. An optical device having a dioptric correction device as claimed in claim 12, further comprising a condition indicating device which indicates condition of dioptric correction in numerical value.

18. The optical device having a dioptric correction device as claimed in claim 12, wherein said image forming unit forms a first image for the left eye and a second image for the right eye, and further including a first and a second display devices for providing dioptric correction for left and right eyes, respectively.

19. The optical device having a dioptric correction device as claimed in claim 18, wherein there exists a first focus range in which said first image is clearly observed and a second range in which said second image is clearly observed, and wherein said dioptric correction device selects a focal point within both said first and second focus ranges.

20. The optical device having a dioptric correction device as claimed in claim 19, wherein said focal point lies away from extremities of both said first and second ranges.

21. An optical device having a dioptric correction device for correcting diopter, comprising:

an image forming unit which forms an image;

an optical system through which said image is observed;

a dioptric correcting device which corrects diopter of said optical system for an eye; and a display device which displays an image at a predetermined position between said image forming unit and said optical system so that at said position a front focal point of said optical system is such that both images of said image forming unit and said display device are unblurred;

wherein said image displayed by said display device is observed only in a mode in which dioptric correction can be performed.

22. An optical device having a dioptric correction device as claimed in claim 21, wherein an image of said image forming unit is observed in said mode.

23. An optical device having a dioptric correction device as claimed in claim 21, further comprising a setting device which sets whether said image forming unit forms an image in said mode.

24. An optical device having a dioptric correction device as claimed in claim 21, wherein said display device is removably arranged in the optical path.

25. An optical device having a dioptric correction device for correcting diopter for left and right eyes, comprising:

an image forming unit which forms an image;

an optical system through which said image is observed;

a dioptric correcting device which corrects diopter of said optical system for an eye;

a display device which displays left and right images having different displayed figures at a predetermined position between said image forming unit and said optical system;

wherein said display device includes first and second display units located between said image forming unit and said optical system.

26. The optical device having a dioptric correction device as claimed in claim 25, wherein said images displayed by said display device provide an indication of a direction in which to move said optical system to focus said image produced by said image forming unit.

27. An optical device having a dioptric correction device for correcting diopter, comprising:

an image forming unit which forms an image;

an optical system through which said image is observed;

a dioptric correcting device which corrects diopter of said optical system for an eye; and a display device that displays an image at a position which is a predetermined distance away from said image forming unit, and wherein a degree of blur of said display device is different from a degree of blur of said image forming unit when diopter is not corrected, and an image of said image forming unit is unblurred when an image of said display device is unblurred.

* * * * *